the ink has a viscosity of 500 mPa·s to 5000 mPa·s. Vivid drawn
(12) United States Patent
Kamagata et al.

(10) Patent No.: US 6,312,510 B1
(45) Date of Patent: Nov. 6, 2001

(54) WATER-BASE WHITE PIGMENT INK FOR BALLPOINTS

(75) Inventors: Tadashi Kamagata, Yokohama; Miki Shinozuka, Hiroshima; Masaru Miyamoto, Yokohama, all of (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/355,371

(22) PCT Filed: Feb. 9, 1998

(86) PCT No.: PCT/JP98/00518

§ 371 Date: Jul. 26, 1999

§ 102(e) Date: Jul. 26, 1999

(87) PCT Pub. No.: WO98/36033

PCT Pub. Date: Aug. 20, 1998

(30) Foreign Application Priority Data

Feb. 13, 1997 (JP) .................................................. 9-029192
Feb. 13, 1997 (JP) .................................................. 9-029193

(51) Int. Cl.⁷ .................................................. C09D 11/00
(52) U.S. Cl. ...................... 106/31.6; 106/1.65; 106/31.72
(58) Field of Search ............................... 106/31.6, 31.65, 106/31.72

(56) References Cited

U.S. PATENT DOCUMENTS 5,683,500 * 11/1997 Kawasumi et al. ................. 106/31.6
5,942,027 * 8/1999 Ikai et al. ........................... 106/31.65
6,120,590 * 9/2000 Miyamoto et al. ................. 106/31.6

FOREIGN PATENT DOCUMENTS

| 63-145380 | 6/1988 | (JP) . |
| 3-157467 | 7/1991 | (JP) . |
| 4-258677 | 9/1992 | (JP) . |
| 5-339534 | 12/1993 | (JP) . |
| 6-287499 | 10/1994 | (JP) . |
| 7-216283 | 8/1995 | (JP) . |

* cited by examiner

Primary Examiner—C. Melissa Koslow
Assistant Examiner—Veronica F. Faison
(74) Attorney, Agent, or Firm—Darby & Darby

(57) ABSTRACT

Provided is a water based white color tone pigment ink for a ballpoint pen comprising titanium oxide, a complementary colorant comprising a pigment or a pseudo pigment obtained by dyeing resin particles with a dye, a resin emulsion, a thickener, water, a polar solvent and other additives, wherein the pigment has an average particle diameter of 100 nm or more; the pseudo pigment has an average particle diameter of 200 nm or more; the resin contained in the resin emulsion has an average particle diameter of 200 nm or more; and the ink has a viscosity of 500 mPa·s to 5000 mPa·s. Vivid drawn lines having a poster color tone can be obtained well even on writing paper having a dark hue. The ink is stable even in long term storage and excellent in a follow-up property and can write continuously.

4 Claims, No Drawings

WATER-BASE WHITE PIGMENT INK FOR BALLPOINTS

TECHNICAL FIELD

The present invention relates to a water based white color tone pigment ink for a ballpoint pen which uses titanium oxide and a complementary colorant for a colorant and can provide drawn lines having a strong color developing property such as a white color and a poster color regardless of a color tone of writing paper and in which the lines printed by means of a writing instrument, a type writer and a copying machine can be covered or corrected, more specifically to a water based white color tone pigment ink for a ballpoint pen which inhibits titanium oxide from settling even in long term storage and which has a good follow-up property and can write continuously.

BACKGROUND ART

An ink having a viscosity of 10 to some 100 centipoises described in Japanese Patent Laid-Open No. Hei 4-258677 has so far been reported as a water based ink using as a colorant titanium oxide, which is a white pigment. However, since this ink does not inhibit titanium oxide from settling, it has to be stirred again in use and has had the inconvenience that a ball for stirring has to be put in a tank for storing.

In contrast with the ink described above, as a water based white color pigment ink for a ballpoint pen which does not settle titanium oxide, an ink comprising a white pigment, tabular silicate and a water soluble resin and having a viscosity of 6,000 to 100,000 centipoises is reported in Japanese Patent Laid-Open No. Hei 6-287499. However, this ink has the problem that it has a high viscosity and is inferior in a follow-up property in writing.

Further, reported in Japanese Patent Laid-Open No. Hei 7-216283 is an ink comprising a white pigment and a nonionic surfactant having an HLB of 17.0 or more and having a viscosity of 6,000 to 50,000 centipoises. This ink also does not solve the problem that the follow-up property in writing is not good because of a high viscosity value.

Further, reported in Japanese Patent Laid-Open No. Hei 8-12916 is an ink comprising titanium oxide, a thickening water-soluble resin and a sugar alcohol and having a viscosity of 6,000 to 50,000 centipoises and a viscosity index of 2 or more which is obtained from a revolution difference of a viscometer. However, even if this viscosity index is met, the inferior follow-up property of the ink in writing quickly and splitting of the drawn lines are not solved. In addition thereto, only a white pigment is added as a coloring material, so that the ink has the problem that the marking performance is inferior on writing paper having a white ground.

DISCLOSURE OF THE INVENTION

An object of the present invention is to provide a water based white color tone pigment ink for a ballpoint pen which uses titanium oxide and a complementary colorant as a colorant and is improved in water resistance and weatherability by using a resin emulsion, which can provide vivid drawn lines having a good poster color tone even on writing paper having a dark color, which is inhibited from settling/separating titanium oxide and from deteriorating in quality even in long term storage and which has a good follow-up property and can write continuously.

The present invention relates to a water based white color tone pigment ink for a ballpoint pen which comprises titanium oxide and a complementary colorant, a resin emulsion, a thickener for preventing settling and separating, a polar solvent, water and other controlling agents required of a water based ink for a ballpoint pen and which provides drawn lines with covering ability and presents various colors of a poster color tone.

BEST MODE FOR CARRYING OUT THE INVENTION

The embodiment of the present invention shall be explained below in detail.

Titanium oxide used in the present invention is used as a white pigment for providing the drawn lines with a covering ability. The kind of titanium oxide includes two kinds of a rutile type and an anatase type depending on a difference in the crystalline structure, and both can be used in the present invention.

Commercial products include Tipaque R-550, Tipaque R-580 and Tipaque R-780 (manufactured by Ishihara Sangyo Kaisha, Ltd.), Titanix JR-300, Titanix JR-701, Titanix JR-801 and Titanix JR-805 (manufactured by Tayca Corporation), and Tipure R-706, Tipure R-900 and Tipure R-960 (manufactured by Du Pont Co., Ltd.). The use amount thereof is preferably 10 to 40% by weight based on the whole amount of the water based ink. Two or more kinds of titanium oxide products can be used in a mixture.

Used as the complementary colorant for toning a color other than a white color, which is a ground color of a titanium oxide particle, is a pigment having an average particle diameter of 100 nm or more or a pseudo pigment obtained by dyeing water-insoluble polymer fine particles having an average particle diameter of 200 nm or more with a dye. A pigment itself is excellent in water resistance and weatherability and provides semi-permanent drawn lines, and when it is present together with a resin emulsion, the drawn lines can be a rainbow color which shows various color tones regardless of intensity and a color tone of the ground color of writing paper.

Examples of the pigments to be used include inorganic pigments such as carbon black, titanium black, zinc oxide, iron oxide red, chromium oxide, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder, and organic pigments such as C. I. Pigment Blue 1, C. I. Pigment Blue 15, C. I. Pigment Blue 17, C. I. Pigment Blue 27, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 83, C. I. Pigment Yellow 95, C. I. Pigment Yellow 166, C. I. Pigment Yellow 167, C. I. Pigment Orange 5, C. I. Pigment Orange 13, C. I. Pigment Orange 16, C. I. Pigment Violet 1, C. I. Pigment Violet 3, C. I. Pigment Violet 19, C. I. Pigment Violet 23, C. I. Pigment Violet 50, and C. I. Pigment Green 7. They are used alone or in combination of plural kinds thereof.

The pseudo pigment obtained by dyeing polymer fine particles with a dye is obtained by dyeing a resin comprising spherical fine particles having a small specific surface area and is characterized by that it has small surface adsorptivity and small coagulation action with titanium oxide and that adsorption-coagulation action between the particles is small. If it has a large particle diameter, a vivid color is developed even on writing paper having a dark hue. In particular, if it has an average particle diameter of 200 nm or more, not only the color development described above but also inhibition of settling of titanium oxide becomes possible, and therefore it is more preferred.

The thickener is used for inhibiting titanium oxide from setting and for providing an ink for a ballpoint pen with a suitable fluidity, and the thickeners have to be selected from ones having a property that they are not reduced in the effect when used in combination with titanium oxide, a resin emulsion and a complementary colorant in a water based ink.

To be specific, there can be used, natural polysaccharides which include seed polysaccharides such as guar gum, locust bean gum, galactomannan, pectin and derivatives thereof, psyllium seed gum and tamarind gum; microbial gums such as xanthane gum, rheozan gum, rhamsan gum, welan gum and gellan gum; sea weed polysaccharides such as carrageenan, alginic acid and derivatives thereof; resin polysaccharides such as tragacanth gum, cellulose and derivatives thereof, and synthetic polymers such as polyacrylic acid and cross-linking type copolymers thereof, polyvinyl alcohol, polyvinylpyrrolidone and derivatives thereof, polyvinyl methyl ether and derivatives thereof.

In particular, the microbial gums are characterized by a strong viscosity-providing effect and physical properties which are stable even after storage over a long period of time but have strong tendencies for propagating miscellaneous germs and coagulating fine powder pigments.

Polyacrylic acid and cross-linking type copolymers thereof are characterized by stability against coagulation of fine powder pigments and propagation of miscellaneous germs but tend to be inferior in a viscosity-providing property to natural polysaccharides. At least one thickener selected from the thickeners described above can be used depending on the addition amounts and the kinds of titanium oxide and the complementary colorant as the ink components.

The addition amount of the thickener is preferably 0.1 to 1.5% by weight based on the whole ink. The addition amount is varied depending on the kind of the thickener. It is preferably 0.1 to 0.8% by weight in the case of natural polysaccharides and preferably 0.1 to 1.5% by weight in the case of synthetic polymers.

The small addition amount of the thickener is liable to cause settling of the titanium oxide particles, and the amount as much as 1.5% by weight or more reduces the fluidity of the ink and therefore tends to be liable to cause inferior writing due to the inferior follow-up property of the ink.

The fluidity can be judged by the viscosity of the ink. For instance, when determined by means of an E type viscometer, which is a conventional rotational viscometer, the viscosity value at 25° C. and 1 rpm has to be 500 mPa·s or more for inhibiting the titanium oxide particles from settling. In order to provide this viscosity, the foregoing amount of the thickener has to be added. Further, if the viscosity value is 5,000 mPa·s or more, the fluidity of the ink is reduced, and the follow-up property of the ink and the feeding property thereof from the pen tip of the ballpoint pen to writing paper are deteriorated. Accordingly, the addition amount of the thickener has to be controlled.

The resin emulsion is required for improving the drawn line color-developing property of the ink on writing paper having a dark hue and inhibiting the titanium oxide particles from settling and separating.

The resin particles dispersed in water and a water base solvent, if they have an average particle diameter of 200 nm or more, are characterized by exhibiting a white color owing to reflection or a refraction effect of light, and the larger the particle diameter is, the larger the reflection effect is and the larger the white color-covering property grows. A hollow resin emulsion in which a refraction effect can be expected to grow larger can be expected to have more white color-covering property, and the excellent drawn line color-developing property of the ink is observed. The presence of the resin emulsion having a large particle diameter among the titanium oxide particles having a large particle diameter can inhibit the titanium oxide particles from coagulating each other, so that the particles are inhibited from growing larger and the settling-prevention effect is revealed.

Further, the particles having a particle diameter of 200 nm or more penetrates into paper fibers of the writing paper to become fillers and inhibit the ink from penetrating, whereby the vivid written lines can be obtained even on writing paper having a dark hue.

Examples of the resin emulsion include Acronal YJ-1556D and Acronal S-400 (manufactured by Mitsubishi Chemicals Corporation), Voncoat AB-735 and Voncoat AN-868 (manufactured by Dainippon Ink and Chemicals Inc.), Microgel E-3101 and Microgel MPE-13 (manufactured by Nippon Paint Co., Ltd.), and STADEX-SC-041-S and STADEX-SC-051-S (manufactured by Japan Synthetic Rubber Co., Ltd.). The hollow resin emulsion includes Ropaque OP-62 and Ropaque OP-84J (manufactured by Rohm & Haas Co., Ltd.) and Nipol MH-5055 (manufactured by Nippon Zeon Co., Ltd.).

The addition amount of the resin emulsion is preferably 5.0 to 25.0% by weight based on the whole ink in terms of the weight of the resin particles. When the use amount is less than 5.0% by weight, covering of a ground color of writing paper having a dark hue and the filling effect are not satisfactory, and a vivid color having a poster color tone can not be developed, so that the drawn lines assume a white color. Further, it is observed that the titanium oxide particles can not be inhibited from coagulating each other and tend to settle. When the use amount is 25.0% by weight or more, it is observed that the interaction with the thickener grows strong and the fluidity of the ink is reduced in spite of the small viscosity value, so that the writing property tends to be deteriorated. Accordingly, the addition amount of the resin emulsion is preferably 5.0 to 25.0% by weight in terms of the weight of the resin particles.

The polar solvent is used for the purpose of providing various qualities as a water based ink for a ballpoint pen, for example, preventing dry-up at the pen tip and freezing at a low temperature.

To be specific, desired water content is 10% by weight or more, preferably 40% by weight or more based on the whole ink.

Such solvent includes water-soluble organic solvents having hygroscopicity such as ethylene glycol, diethylene glycol, propylene glycol, polyethylene glycol, polypropylene glycol, thiodiglycol, glycerin, diglycerin, 2-pyrrolidone, N-methyl-2-pyrrolidone, dimethylformamide and dimethylimidazolidinone. They are used preferably alone or in combination of plural kinds thereof.

Added are, if necessary, pH adjusting agents such as ammonia, urea, monoethanolamine, diethanolamine, triethanolamine, alkali metal salts of carbonic acid and phosphoric acid such as sodium tripolyphosphate and sodium carbonate, and hydroxides of alkali metals such as sodium hydroxide; preservatives or fungicides such as phenol, sodium omadine, sodium pentachlorophenol, 1,2-benzisothiazoline-3-one, 2,3,5,6-tetrachloro-4-(methylsulfonyl)pyridine, alkali metal salts of benzoic acid, sorbic acid and dehydroacetic acid such as sodium benzoate, and benzimidazole base compounds; rust preventives such as benzotriazole, dicyclohexylammonium nitrite, diisopropylammonium nitrite and tolyltriazole; lubricants and wetting agents such as derivatives of polyoxyethylene, polyoxypropylene or polyoxyethylenepolyoxypropylene such as polyoxyethylene lauryl ether, derivatives of glycerin, diglycerin or polyglycerin such as tetraglycerin distearate, sorbitan derivatives such as sorbitan monooleate, surfactants having fluorinated alkyl groups such as perfluoroalkylphosphoric acid esters, and polyether-modified silicone including polyethylene glycol adducts of dimethylpolysiloxane.

These surfactants given as examples of lubricants and wetting agents have also a function as a dispersion-stabilizing agent for a pigment, a pseudo pigment and titanium oxide particles. However, preferably used as dispersants are anionic surfactants such as alkylated sulfonic acid salts of higher fatty acid amides and alkylarylsulfonic acid salts, and water soluble polymers such as polyvinylpyrrolidone, polyvinyl alcohol, polyacrylic acid, acrylic acid copolymers, acrylic-methacrylic acid base resins, styrene-acryl base resins, maleic acid resins and styrene-maleic acid base resins.

Various methods which have so far been known can be used for producing the water based white color tone pigment ink for a ballpoint pen of the present invention. It can readily be obtained, for example, by blending the respective components described above and mixing and stirring them by means of a stirrer such as a dissolver or mixing and crushing them by means of a ball mill or three rolls and then removing coarse particles of the pigment particles and the titanium oxide particles, undissolved substances and contaminated solid by centrifugation and filtration.

The present invention shall be explained below in more details with reference to examples, but the present invention shall by no means be restricted by them.

EXAMPLES

Example 1

| | |
|---|---|
| Titanium oxide (Titanix JR-701 manufactured by Tayca Corporation.) | 20.0 parts by weight |
| White carbon | 2.0 parts by weight |
| Hollow resin emulsion (Ropaque OP-62: manufactured by Rohm & Haas Co., Ltd.) *resin solid content: 37.5%, average particle diameter: 400 nm | 40.0 parts by weight |
| Propylene glycol | 10.0 parts by weight |
| Xanthane gum | 0.5 part by weight |
| Potassium oleate | 0.5 part by weight |
| Purified water | 27.0 parts by weight |

The compounds described above were filtered after stirring to thereby obtain a water based ink for a ballpoint pen.

Example 2

| | |
|---|---|
| Titanium oxide (Titanix JR-701 manufactured by Tayca Corporation.) | 20.0 parts by weight |
| Lacqutimine color Golden Yellow FL2R Conc (manufactured by Dainichiseika Color & Chemicals MFG. Co., Ltd.) | 15.0 parts by weight |
| Hollow resin emulsion (Ropaque OP-62: manufactured by Rohm & Haas Co., Ltd.) *resin solid content: 37.5%, average particle diameter: 400 nm | 40.0 parts by weight |
| Propylene glycol | 5.0 parts by weight |
| Xanthane gum | 0.5 part by weight |
| Potassium oleate | 0.5 part by weight |
| Purified water | 19.0 parts by weight |

The compounds described above were filtered after stirring to thereby obtain a water based ink for a ballpoint pen.

Example 3

| | |
|---|---|
| Titanium oxide (Titanix JR-701 manufactured by Tayca Corporation.) | 20.0 parts by weight |
| Lacqutimine color Blue FL2B Conc (manufactured by Dainichiseika Color & Chemicals MFG. Co., Ltd.) | 15.0 parts by weight |
| Hollow resin emulsion (Ropaque OP-62: manufactured by Rohm & Haas Co., Ltd.) *resin solid content: 37.5%, average particle diameter: 400 nm | 40.0 parts by weight |
| Propylene glycol | 5.0 part by weight |
| Welan gum (KIA96: manufactured by Sansho Co., Ltd.) | 0.5 part by weight |
| Potassium oleate | 0.5 part by weight |
| Purified water | 19.0 parts by weight |

The compounds described above were filtered after stirring to thereby obtain a water based ink for a ballpoint pen.

Example 4

| | |
|---|---|
| Titanium oxide (Titanix JR-701 manufactured by Tayca Corporation.) | 20.0 parts by weight |
| Lacqutimine color Green FLB Conc (manufactured by Dainichiseika Color & Chemicals MFG. Co., Ltd.) | 15.0 parts by weight |
| Hollow resin emulsion (Ropaque OP-62: manufactured by Rohm & Haas Co., Ltd.) *resin solid content: 37.5%, average particle diameter: 400 nm | 40.0 parts by weight |
| Propylene glycol | 5.0 parts by weight |
| Welan gum (KIA96: manufactured by Sansho Co., Ltd.) | 0.3 part by weight |
| Xanthane gum | 0.1 part by weight |
| Potassium oleate | 0.5 part by weight |
| Purified water | 19.1 parts by weight |

The compounds described above were filtered after stirring to thereby obtain a water based ink for a ballpoint pen.

Example 5

| | |
|---|---|
| Titanium oxide (Titanix JR-701 manufactured by Tayca Corporation.) | 20.0 parts by weight |
| Pseudo pigment (Lumikol 2300: manufactured by Nippon Keiko Co., Ltd.) *resin solid content: 50.0%, average particle diameter: 300 nm | 10.0 parts by weight |
| Hollow resin emulsion (Ropaque OP-62: manufactured by Rohm & Haas Co., Ltd.) *resin solid content: 37.5%, average particle diameter: 400 nm | 40.0 parts by weight |
| Propylene glycol | 10.0 parts by weight |
| Xanthane gum | 0.5 part by weight |
| Potassium oleate | 0.5 part by weight |
| Purified water | 19.0 parts by weight |

The compounds described above were filtered after stirring to thereby obtain a water based ink for a ballpoint pen.

Example 6

| | |
|---|---|
| Titanium oxide (Titanix JR-701 manufactured by Tayca Corporation.) | 20.0 parts by weight |
| Pseudo pigment (Nile Red L-606: (manufactured by Mikuni Color Co., Ltd.) *resin solid content: 40.0%, average particle diameter: 500 nm | 10.0 parts by weight |
| Hollow resin emulsion (Ropaque OP-62: manufactured by Rohm & Haas Co., Ltd.) *resin solid content: 37.5%, average particle diameter: 400 nm | 40.0 parts by weight |
| Propylene glycol | 5.0 parts by weight |
| Welan gum (K1A96: manufactured by Sansho Co., Ltd.) | 0.5 part by weight |
| Potassium oleate | 0.5 part by weight |
| Purified water | 24.0 parts by weight |

The compounds described above were filtered after stirring to thereby obtain a water based ink for a ballpoint pen.

Example 7

| | |
|---|---|
| Titanium oxide (Titanix JR-701 manufactured by Tayca Corporation.) | 20.0 parts by weight |
| Pseudo pigment (Nile Red L-606: manufactured by Mikuni Dye Co., Ltd.) *resin solid content: 40.0%, average particle diameter: 500 nm | 10.0 parts by weight |
| Hollow resin emulsion (Ropaque OP-62: manufactured by Rohm & Haas Co., Ltd.) *resin solid content: 37.5%, average particle diameter: 400 nm | 40.0 parts by weight |
| Propylene glycol | 5.0 parts by weight |
| Xanthane gum | 0.1 part by weight |
| Welan gum (KIA96: manufactured by Sansho Co., Ltd.) | 0.3 part by weight |
| Potassium oleate | 0.5 part by weight |
| Purified water | 24.1 parts by weight |

The compounds described above were filtered after stirring to thereby obtain a water based ink for a ballpoint pen.

Comparative Example 1

| | |
|---|---|
| Titanium oxide (Titanix JR-701 manufactured by Tayca Corporation.) | 20.0 parts by weight |
| Lacqutimine color Golden Yellow FL2R Conc (manufactured by Dainichiseika Color & Chemicals MFG. Co., Ltd.) | 15.0 parts by weight |
| Propylene glycol | 10.0 parts by weight |
| Xanthane gum | 0.5 part by weight |
| Potassium oleate | 0.5 part by weight |
| Purified water | 54.0 parts by weight |

The compounds described above were filtered after stirring to thereby obtain a water based ink.

Comparative Example 2

| | |
|---|---|
| Titanium oxide (Titanix JR-701 manufactured by Tayca Corporation.) | 20.0 parts by weight |
| Lacqutimine color Golden Yellow FL2R Conc (manufactured by Dainichiseika Color & Chemicals MFG. Co., Ltd.) | 15.0 parts by weight |
| Joncryl J-780 (manufactured by Johnson Polymer Co., Ltd.) *resin particle content: 42%, average particle diameter: 100 nm | 36.0 parts by weight |
| Propylene glycol | 5.0 parts by weight |
| Xanthane gum | 0.5 part by weight |
| Potassium oleate | 0.5 part by weight |
| Purified water | 23.0 parts by weight |

The compounds described above were filtered after stirring to thereby obtain a water based ink.

Comparative Example 3

| | |
|---|---|
| Titanium oxide (Titanix JR-701 manufactured by Tayca Corporation.) | 20.0 parts by weight |
| Blue dye (Water Blue #105: manufactured by Orient Chemical Ind. Ltd.) | 5.0 parts by weight |
| Hollow resin emulsion (Ropaque OP-62: manufactured by Rohm & Haas Co., Ltd.) *resin solid content: 37.5%, average particle diameter: 400 nm | 40.0 parts by weight |
| Propylene glycol | 5.0 parts by weight |
| Welan gum (KIA96: manufactured by Sansho Co., Ltd.) | 0.5 part by weight |
| Potassium oleate | 0.5 part by weight |
| Purified water | 29.0 parts by weight |

The compounds described above were filtered after stirring to thereby obtain a water based ink.

Comparative Example 4

| | |
|---|---|
| Lacqutimine color Green FLB Conc (manufactured by Dainichiseika Color & Chemicals MFG. Co., Ltd) | 15.0 parts by weight |
| Hollow resin emulsion (Ropaque OP-62: manufactured by Rohm & Haas Co., Ltd.) | 40.0 parts by weight |

-continued

| | |
|---|---|
| *resin solid content: 37.5%, average particle diameter: 400 nm | |
| Propylene glycol | 10.0 parts by weight |
| Welan gum (KIA96: manufactured by Sansho Co., Ltd.) | 0.3 part by weight |
| Xanthane gum | 0.1 part by weight |
| Potassium oleate | 0.5 part by weight |
| Purified water | 34.1 parts by weight |

The compounds described above were filtered after stirring to thereby obtain a water based ink.

Comparative Example 5

| | |
|---|---|
| Titanium oxide (Titanix JR-701 manufactured by Tayca Corporation.) | 20.0 parts by weight |
| Pseudo pigment (Lumikol 3200: manufactured by Nippon Keiko Co., Ltd.) *resin solid content: 50.0%, average particle diameter: 100 nm | 10.0 parts by weight |
| Propylene glycol | 10.0 parts by weight |
| Xanthane gum | 0.5 part by weight |
| Potassium oleate | 0.5 part by weight |
| Purified water | 59.0 parts by weight |

The compounds described above were filtered after stirring to thereby obtain a water based ink.

Comparative Example 6

| | |
|---|---|
| Titanium oxide (Titanix JR-701 manufactured by Tayca Corporation.) | 20.0 parts by weight |
| Pseudo pigment (Lumikol 3200: manufactured by Nippon Keiko Co., Ltd.) *resin solid content: 50.0%, average particle diameter: 100 nm | 10.0 parts by weight |
| Joncryl J-780 (manufactured by Johnson Polymer Co., Ltd.) *resin particle content: 42%, average particle diameter: 100 nm | 36.0 parts by weight |
| Welan gum (KIA96: manufactured by Sansho Co., Ltd.) | 0.5 part by weight |
| Potassium oleate | 0.5 part by weight |
| Purified water | 33.0 parts by weight |

The compounds described above were filtered after stirring to thereby obtain a water based ink.

Seven kinds of the inks obtained in the examples and six kinds of the inks obtained in the comparative examples were tested by the following test methods to obtain results shown in Table 1 and Table 2.

The test methods shall be explained below.

(1) Average Particle Diameter:

The average particle diameter is determined by means of NICOMP 370 (manufactured by Nozaki & Co., Ltd.) using a photon correlation method within a week and after left standing at room temperature for 6 months after preparing the inks.

(2) Viscosity Value:

The viscosity value at 1 rpm was determined at 25° C. by means of an EMD type viscometer (manufactured by Toki Sangyo Co., Ltd.) within a week and after left standing at room temperature for 6 months after preparing the inks.

(3) The ink was filled into a refill comprising a polypropylene-made ink reservoir having an inner diameter of 3.5 mm and a length of 100 mm and having no feed and a stainless steel-made tip having a ball diameter of 0.7 mm to prepare a ballpoint pen A for evaluation.

This ballpoint pen A for evaluation was used to write on a Xerox M paper (absorbent paper), a black coat paper (non-absorbent paper) and a black drawing paper (absorbent paper: New Color No. 418 manufactured by Shikoku Paper Co., Ltd.) respectively to observe the color developing property of the drawn lines thereof with eyes.

The evaluation standard is based on the following 5 grade evaluation:

○: sharp color-developing property is obtained

●: only white color can be observed

Δ: coloring is reduced, and the ground color of the writing paper can be observed ▲: pale white drawn lines, and the ground color of the writing paper can be observed X: drawn lines can scarcely be observed (4) The ballpoint pen A for evaluation was used for quickly writing spirals with a hand, and the presence of starving and splitting in the resulting lines was observed with eyes:

◎: not present at all

○: slightly present

Δ: a little present

X: present very much

TABLE 1

| | Average particle diameter (nm) | | Viscosity value (mPa · s) | |
|---|---|---|---|---|
| | Initial | After 6 months | Initial | After 6 months |
| Example-1 | 380 | 405 | 2600 | 2950 |
| Example-2 | 375 | 400 | 2300 | 2700 |
| Example-3 | 385 | 406 | 2850 | 3060 |
| Example-4 | 380 | 408 | 3100 | 3400 |
| Example-5 | 390 | 410 | 2250 | 2500 |
| Example-6 | 525 | 550 | 1800 | 2060 |
| Example-7 | 540 | 550 | 2640 | 3100 |
| Comparative Example-1 | 290 | 668 | 2080 | 4750 |
| Comparative Example-2 | 306 | 551 | 5560 | 8200 |
| Comparative Example-3 | 390 | 406 | 2600 | 6540 |
| Comparative Example-4 | 400 | 404 | 1500 | 1700 |
| Comparative Example-5 | 280 | 636 | 2820 | 5500 |
| Comparative Example-6 | 287 | 820 | 5280 | 9040 |

It is apparent from the results shown in Table 1 that the inks obtained in the examples have less variation in coagulation of the titanium oxide particles and the thickening property with the lapse of time and are stable.

TABLE 2

| | Ink color-developing property | | | Ink follow-up property | |
|---|---|---|---|---|---|
| | Xerox M paper | Black drawing paper | Coat paper | Starving | Splitting |
| Example-1 | ▲ | ● | ● | ◎ | ◎ |
| Example-2 | ○ | ○ | ○ | ◎ | ◎ |
| Example-3 | ○ | ○ | ○ | ◎ | ○ |
| Example-4 | ○ | ○ | ○ | ◎ | ○ |
| Example-5 | ○ | ○ | ○ | ◎ | ◎ |
| Example-6 | ○ | ○ | ○ | ◎ | ◎ |
| Example-7 | ○ | ○ | ○ | ◎ | ○ |
| Comparative Example-1 | ▲ | ▲ | ▲ | Δ | Δ |
| Comparative Example-2 | ▲ | ▲ | Δ | X | X |
| Comparative Example-3 | ▲ | ▲ | Δ | Δ | Δ |
| Comparative Example-4 | ▲ | X | ▲ | ○ | ○ |
| Comparative Example-5 | ▲ | ▲ | Δ | Δ | Δ |
| Comparative Example-6 | ▲ | ▲ | Δ | X | X |

It can be judged from the results shown in Table 2 that the inks obtained in the examples are excellent in an ink color-developing property and an ink follow-up property.

INDUSTRIAL APPLICABILITY

The ink of the present invention having a poster color of a white color tone is stable without causing coagulation of the titanium oxide particles and the complementary colorant owing to the presence of the resin emulsion having an average particle diameter of 200 nm or more and covers the ground color of writing paper, so that drawn lines having a poster color which is excellent in a color development can be obtained on any writing paper. Accordingly, it is useful as a water based white color tone pigment ink for a ballpoint pen.

What is claimed is:

1. A water based white color tone pigment ink for a ballpoint pen comprising titanium oxide, a complementary colorant comprising a pigment or a pseudo pigment obtained by dyeing resin particles with a dye, an emulsion of a hollow resin having an average particle diameter of 200 nm or more, a thickener, water and a polar solvent.

2. The water based white color tone pigment ink for a ballpoint pen as described in claim 1, wherein the complementary colorant comprises a pigment having an average particle diameter of 100 nm or more.

3. The water based white color tone pigment ink for a ballpoint pen as described in claim 1, wherein the complementary colorant comprises a pseudo pigment having an average particle diameter of 200 nm or more.

4. The water based white color tone pigment ink for a ballpoint pen as described in any of claim 1, wherein the ink has a viscosity of 500 mPa·s or more and less than 5000 mPa·s at 25° C.

* * * * *

UNITED STATES PATENT AND TRADEMARK OFFICE
CERTIFICATE OF CORRECTION

PATENT NO.    : 6,312,510 B1
DATED         : November 6, 2001
INVENTOR(S)   : Tadashi Kamagata et al.

It is certified that error appears in the above-identified patent and that said Letters Patent is hereby corrected as shown below:

<u>Title page, Item [54] and Column 1, lines 1-2,</u>
Change "WATER-BASE WHITE PIGMENT INK FOR BALLPOINTS" to
-- WATER BASED WHITE COLOR TONE PIGMENT INK FOR BALLPOINT PEN--.

Signed and Sealed this

Second Day of July, 2002

*Attest:*

*Attesting Officer*

JAMES E. ROGAN
*Director of the United States Patent and Trademark Office*